United States Patent
Damiano

(10) Patent No.: US 6,910,826 B1
(45) Date of Patent: Jun. 28, 2005

(54) BREAKAWAY COUPLING

(75) Inventor: Armand A. Damiano, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 8 days.

(21) Appl. No.: 10/284,571

(22) Filed: Oct. 30, 2002

(51) Int. Cl.$^7$ .............................. F16D 9/00
(52) U.S. Cl. ............. 403/2; 403/21; 411/2; 411/427; 411/429
(58) Field of Search .................. 403/2, 21, 293, 403/297, 186; 411/2, 427, 433, 903, 432, 411/429; 256/12.5, 13.1; 404/4–8; 52/98

(56) References Cited

U.S. PATENT DOCUMENTS

| | | | | |
|---|---|---|---|---|
| 2,282,641 A | * | 5/1942 | Corey | 285/2 |
| 3,521,413 A | | 7/1970 | Scott et al. | 52/98 |
| 3,552,698 A | | 1/1971 | Kinney | 248/158 |
| 3,572,223 A | | 3/1971 | Vierregger | 94/1.5 |
| 3,630,474 A | | 12/1971 | Minor | 248/158 |
| 3,637,244 A | | 1/1972 | Strizki | 287/129 |
| 3,837,752 A | | 9/1974 | Shewchuk | 403/2 |
| 4,007,564 A | | 2/1977 | Chisholm | 52/98 |
| 4,052,826 A | * | 10/1977 | Chisholm | 52/98 |
| 4,068,555 A | * | 1/1978 | Volkman | 411/2 |
| 4,472,095 A | * | 9/1984 | Molina | 411/304 |
| 4,528,786 A | | 7/1985 | Dinitz et al. | 52/98 |
| 4,638,608 A | * | 1/1987 | Coy | 52/98 |
| 4,923,319 A | | 5/1990 | Dent | 403/2 |
| 4,926,592 A | | 5/1990 | Nehls | 52/98 |
| 4,974,888 A | * | 12/1990 | Childers | 292/251 |
| 5,015,133 A | * | 5/1991 | Arena | 411/267 |
| 5,108,133 A | * | 4/1992 | Maloberti | 285/34 |
| 5,139,381 A | * | 8/1992 | Lubreski et al. | 411/433 |
| 5,340,252 A | * | 8/1994 | Weddendorf | 411/267 |
| 5,474,408 A | | 12/1995 | Dinitz et al. | 411/5 |
| 5,499,885 A | | 3/1996 | Chapman | 403/380 |
| 6,065,894 A | * | 5/2000 | Wasson et al. | 403/2 |
| 6,305,890 B1 | * | 10/2001 | Okamura | 411/431 |
| 6,406,240 B1 | * | 6/2002 | Potter | 411/433 |

* cited by examiner

Primary Examiner—Robert J. Sandy
Assistant Examiner—Ruth C. Rodriguez
(74) Attorney, Agent, or Firm—Thomte, Mazour & Niebergall; Dennis L. Thomte

(57) ABSTRACT

A breakaway coupling for a light pole or the like is disclosed and is utilized on each of the anchor bolts of the foundation for the pole. Each of the couplings comprises a metal coupling nut which has a plurality of radially spaced-apart and vertically disposed slits formed therein which extend thereinto to create weakened areas or zones in the coupling nut. The coupling nut is embedded in a fiber-reinforced material which provides the necessary hoop strength to the coupling nut. The base plate of the pole is positioned on the upper ends of the coupling nuts and is secured thereto by bolts extending downwardly through the base plate of the pole. If the pole is struck by a vehicle, the fiber-reinforced body members, as well as the coupling nuts, fracture to permit the pole to break away from the foundation. The fiber-reinforced body member of the coupling not only adds hoop strength to the coupling nut, but prevents the metal coupling nut from being exposed to corrosive elements such as salt or the like.

33 Claims, 4 Drawing Sheets

US 6,910,826 B1

BREAKAWAY COUPLING

BACKGROUND OF THE INVENTION

1. Field of the Invention

This invention relates to a breakaway coupling or connector and more particularly to a breakaway coupling or connector for use with roadside light poles or the like.

2. Description of the Related Art

It is well-recognized that roadside standards such as light poles or traffic standards pose a threat to vehicular traffic. Many attempts have previously been made to provide breakaway couplings or connectors for the lower ends of the poles so that the poles will break away from their supporting foundations if the poles are struck by a vehicle. The breakaway couplings or connectors must not only permit the pole to break away from its supporting foundation, but must also be able to withstand the weight of the pole thereon and must also be able to withstand wind loading. Various devices are illustrated in U.S. Pat. Nos. 3,521,413; 3,630,474; 4,007,564; 4,528,786; 5,499,885; 4,926,592; 3,552,698; 3,572,223; 3,637,244; and 3,837,752. While the devices of the prior art patents may represent an improvement in the art, those embodiments which are made of metal may become weakened due to the fact that they are constantly exposed to corrosive materials and the like.

SUMMARY OF THE INVENTION

The breakaway coupling or connector of this invention is designed to be used with a support pole and a foundation therefore. The foundation has a plurality of elongated vertically disposed anchor bolts set therein which extend upwardly therefrom and which have externally threaded upper ends. The breakaway coupling of this invention is mounted on each of the threaded upper ends of the anchor bolts. Each of the breakaway couplings comprises a metal coupling nut having an internally threaded bore extending between the upper and lower ends thereof. A plurality of radially spaced-apart and vertically disposed slits, slices or grooves are formed in the outer surface of the coupling nut which extend inwardly thereinto towards the internally threaded bore. The coupling nut may be hexagonally-shaped, square or even possibly cylindrical in shape. A reinforcing body member extends around each of the coupling nuts to add hoop strength to the coupling nut. The base portion of the pole is positioned on the upper ends of the coupling nuts and bolts are extended downwardly through the openings in the base portion of the pole which are threadably received by the upper ends of the coupling nuts. Preferably, the body member is comprised of a fiber-reinforced material. The fiber could be steel, carbon, Kevlar, etc. The body member may be comprised of nylon, glass reinforced nylon or plastic. The body member not only adds hoop strength to the coupling nut, but prevents corrosive materials from coming into contact with the metal coupling nut. If the pole is struck by a vehicle, the fiber-reinforced body member will fracture as will the coupling nut due to the weakened areas created by the slits or slices extending into the coupling nut.

It is therefore a principal object of the invention to provide an improved breakaway coupling for coupling a pole structure to a supporting foundation.

A further object of the invention is to provide an improved breakaway coupling or connector for a light pole or the like.

Still another object of the invention is to provide a breakaway coupling which includes means for preventing the metal coupling nut thereof from coming into contact with corrosive elements.

Yet another object of the invention is to provide a unique breakaway coupling nut which has radially spaced-apart and vertically disposed slits extending thereinto which creates weakened areas to enable the coupling to fracture if the pole is struck by a vehicle.

These and other objects will be apparent to those skilled in the art.

DESCRIPTION OF THE PREFERRED EMBODIMENT

Figure 1:
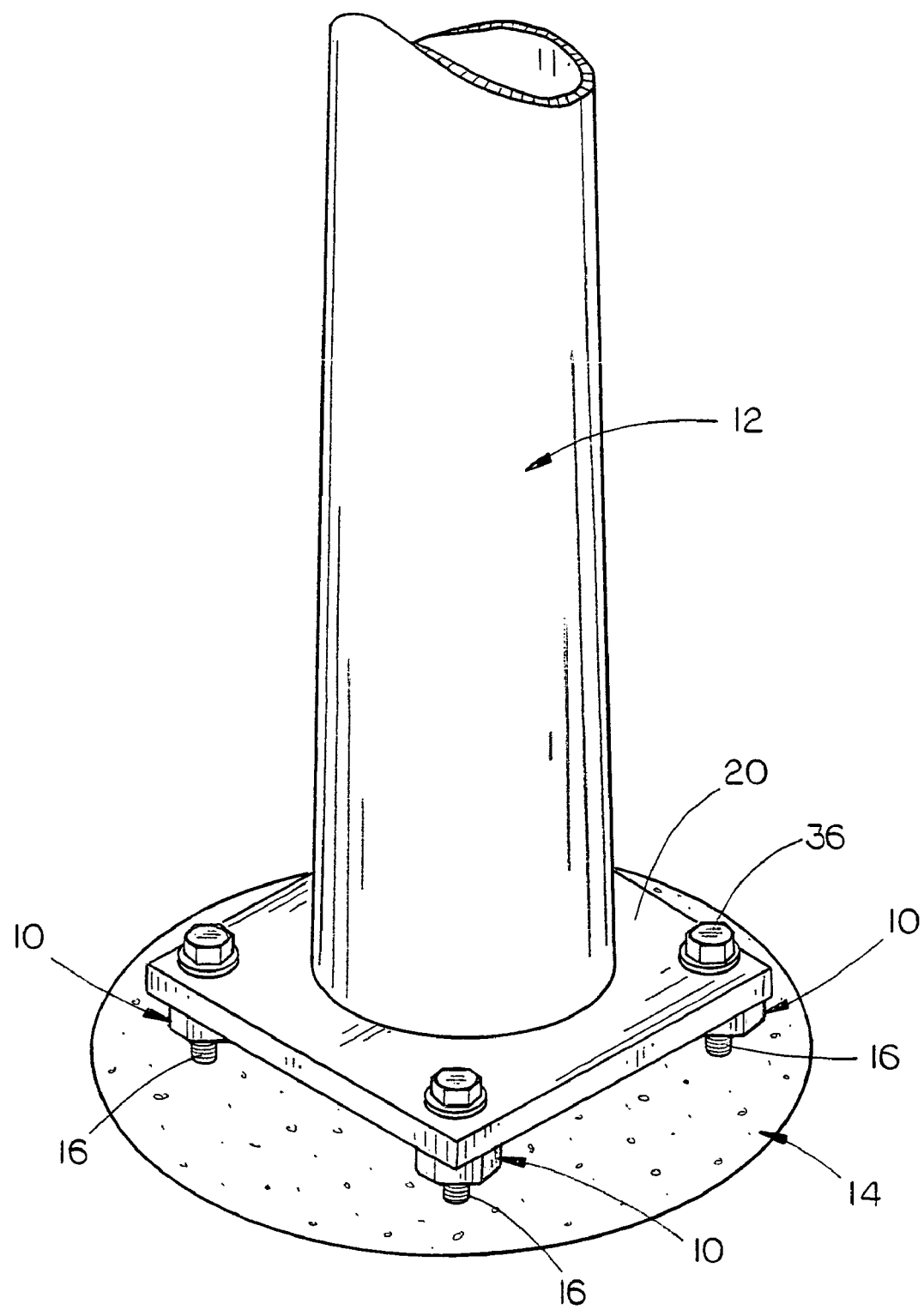
FIG. 1 is a partial perspective view of a pole having a plurality of breakaway couplings associated therewith.
Figure 2:
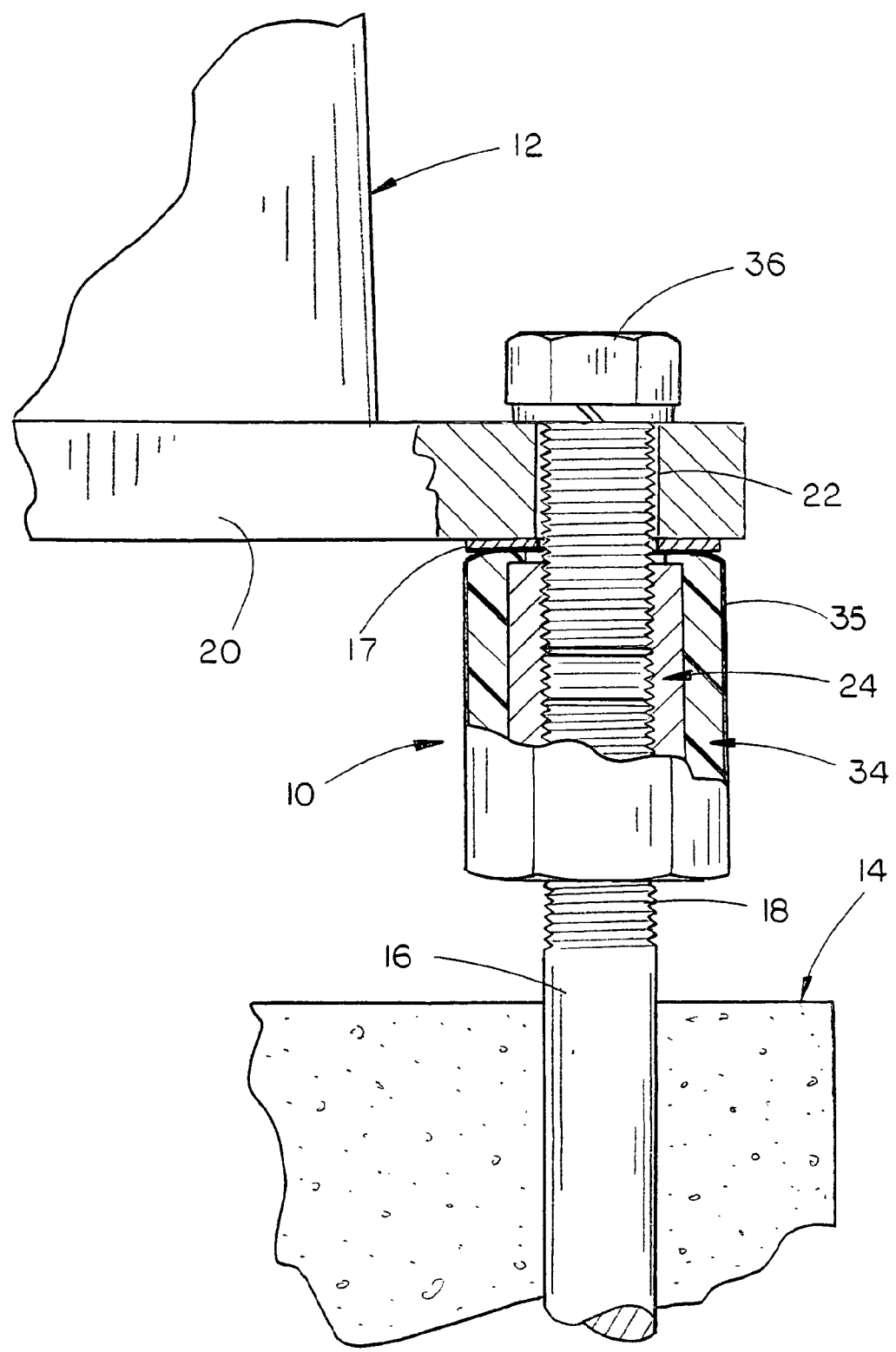
FIG. 2 is a partial sectional view illustrating the manner in which the breakaway coupling is positioned between the anchor bolts and the support plate of the pole.

The breakaway coupling of this invention is referred to generally by the reference numeral 10 and is designed to couple or connect a pole 12 to a foundation or footing 14 having a plurality of anchor bolts 16 set therein which have an externally threaded upper end 18. Pole 12 includes a horizontally disposed base plate 20 having a plurality of openings 22 formed therein which correspond to the number and configuration of the anchor bolts 16. In other words, if footing 14 has four anchor bolts set therein in a square or rectangular fashion, base plate 20 would have four openings 22 formed therein which are arranged in a square or rectangular fashion.

Coupling 10 includes a metal coupling nut 24 having an upper end 26, lower end 28 and an internally threaded bore 29 extending between the upper and lower ends of the nut 24. For purposes of description, coupling nut 24 will be described as having an outer surface 30. The preferred shape of the coupling nut 24 is hexagonal, but a square shape could also be utilized. Further, it is possible that coupling nut 24 could have a cylindrical shape.

Figure 4:
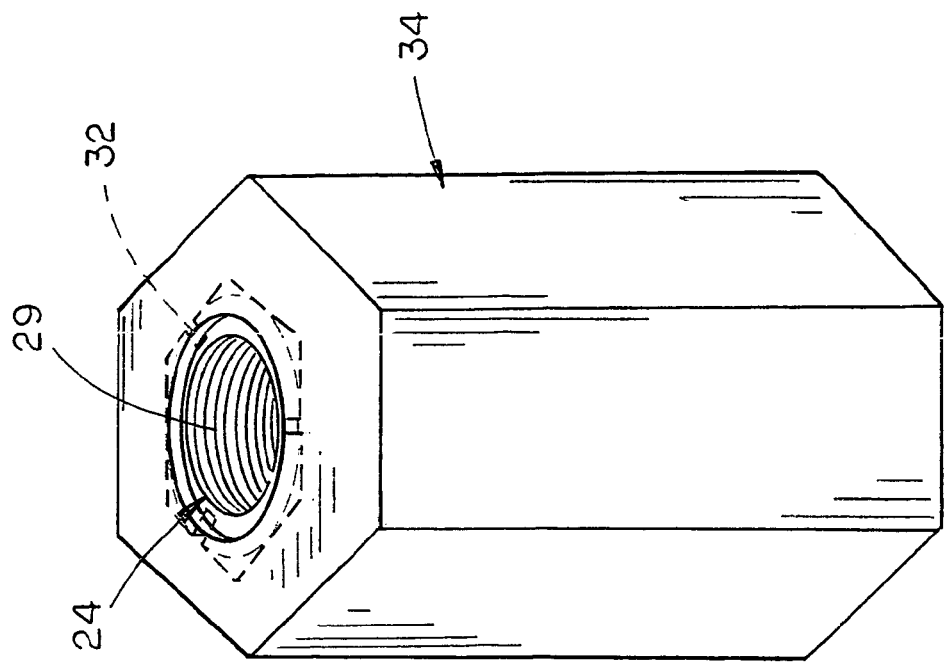
FIG. 4 is a perspective view of the breakaway coupling.
Figure 3:
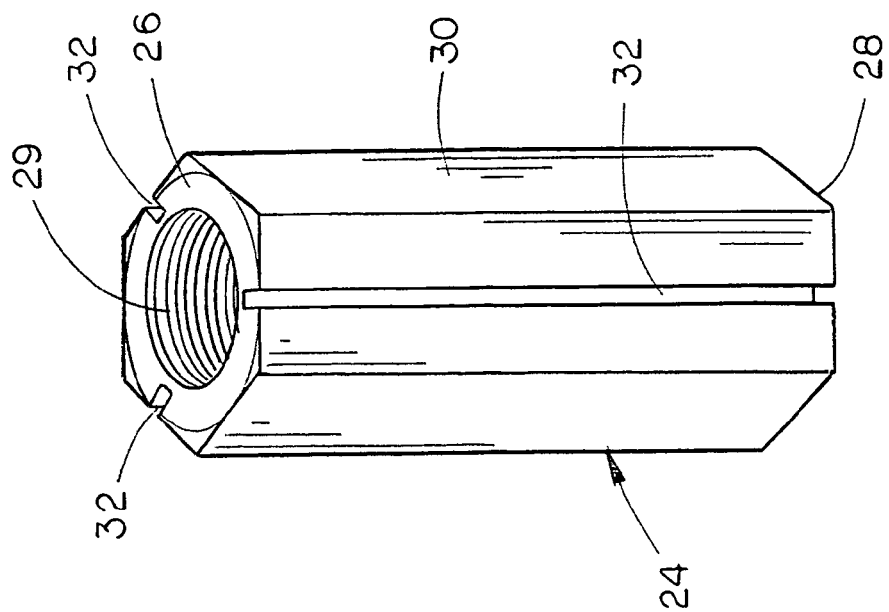
FIG. 3 is a perspective view of the metal coupling nut.

A plurality of radially spaced-apart and vertically disposed slits, slices or grooves 32 extend into the outer surface 30 of nut 24 towards the internally threaded bore 28. The depth of the slits 32, as well as the spacing thereof, will be dictated by the particular situation such as the type of pole, the height of the pole, the use to which the pole will be made, etc. The slits 32 are provided to create weakened areas or zones within the coupling nut so that the coupling nut 24 will fracture if the pole is struck by a vehicle to permit the pole to break away from the foundation. The numeral 34 (FIG. 4) refers to a reinforcing body member which extends around coupling nut 24 for two reasons. The body member 34 adds hoop strength to the coupling nut 24 and prevents the metal coupling nut 24 from being exposed to corrosive elements. Preferably, the body member 34 is comprised of a fiber-reinforced material with the fibers being comprised of steel, carbon, Kevlar, etc. The remainder of the material of the body member 34 may be nylon, glass, plastic, etc. As seen in FIG. 4, the upper end of the body member 34 totally encases the upper end of the coupling nut 24 for corrosion protection. The lower end of the body member 34 also totally encloses the coupling nut for corrosion protection. In other words, the upper and lower ends of the coupling 10 are identical so that the coupling is "reversible."

Figure 6:
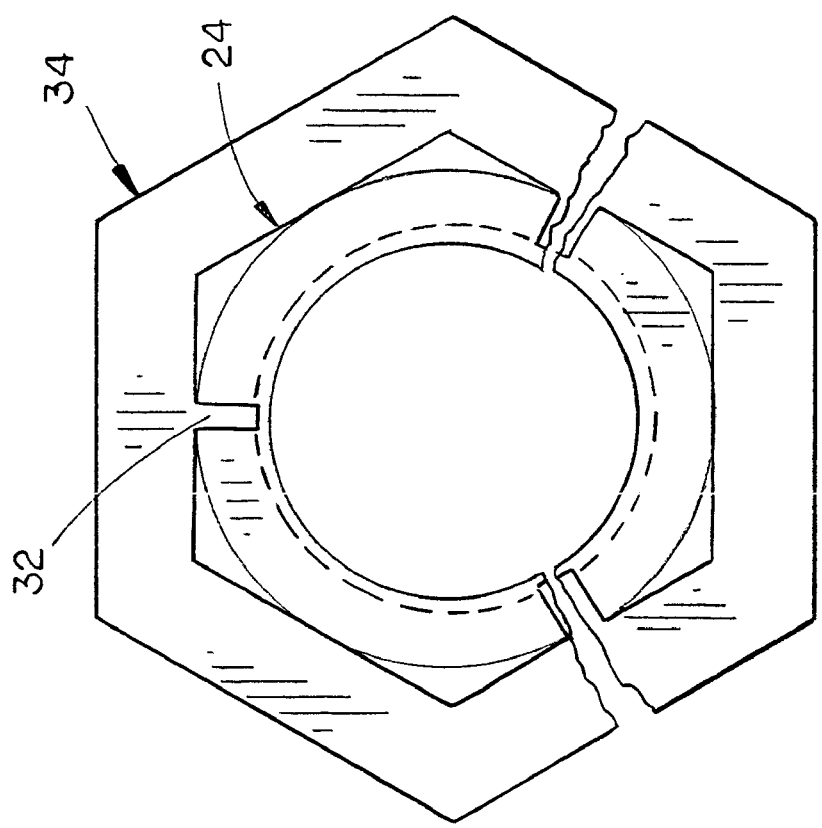
FIG. 6 is a top elevational view similar to FIG. 5 except that it is illustrates the manner in which the breakaway coupling fractures.
Figure 5:
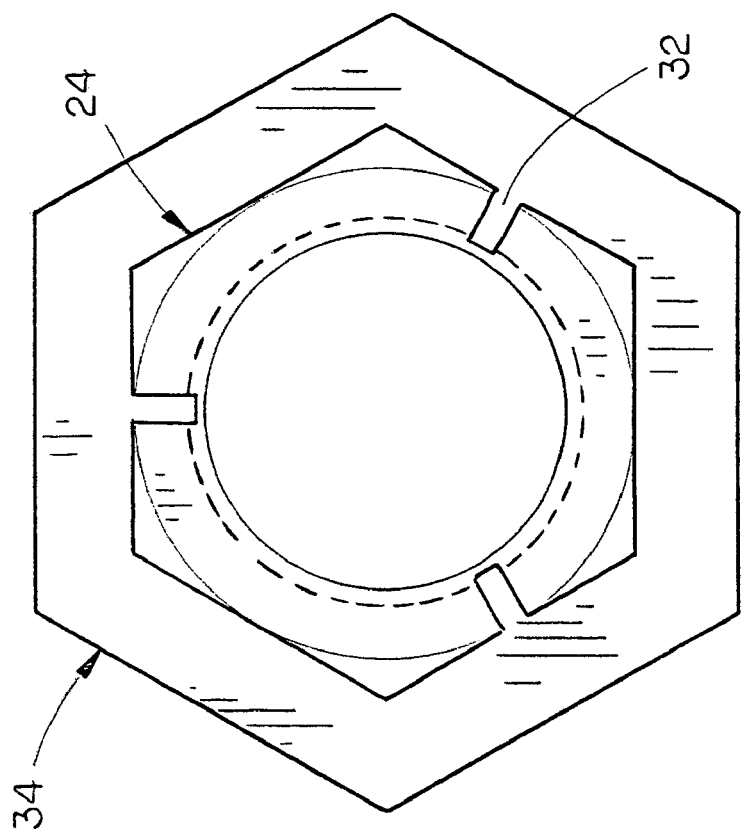
FIG. 5 is a top elevational view of the breakaway coupling.

A breakaway coupling 10 is threadably mounted on each of the anchor bolts 16, as illustrated in the drawings. A washer 17 is positioned on the upper end of the coupling 10. Base plate 20 is mounted on the upper ends of the coupling nuts and bolts 36 are extended down through the openings in washer 17 and through openings 22 formed in base plate 20 for threadable reception in the upper ends of the internally threaded bores 28 of the coupling nuts 24. If the pole is struck by a vehicle, the body member 34 will fracture as will the coupling nuts (FIG. 6) to enable the pole to break away from the foundation. As previously stated, the body member 34 not only adds hoop strength to the coupling nut 24, but also prevents the metal coupling nut 24 from coming into contact or being exposed to corrosive elements. In certain situations, it may be desirable to coat the exterior surface of the body member 34 with a spray metal overcoat such as zinc or the like such as a liquid coating to protect the body member 34 from environmental exposure such as UV.

Although the drawings illustrate that the material of the body member 34 fills the slits 32, the slits 32 could be filled with another material if so desired.

The breakaway coupling of this invention also functions as a leveling nut for the pole. The slit widths are designed to facilitate complete breaking away from the foundation anchor bolts. When the bolts 36 break, the coupling nut slit width determines how the breakaway coupling "opens". When the "opening" is smaller than the diameter of the bolt 36, the entire coupling nut will break apart to allow exit of the bolt 36. Such is a favorable feature, as it tends to remove potential remains from staying in the foundation bolt and thus helps to avoid damage to the car's undercarriage or gas tank.

Thus it can be seen that a unique breakaway coupling has been provided which accomplishes at least all of its stated objectives.

I claim:

1. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:
    a coupling nut threadably mounted on each of said bolt members;
    each of said coupling nuts having an upper end, a lower end, an internally threaded bore extending between said upper and lower ends, and an outer surface;
    each of said externally threaded upper ends of said bolt members threadably receiving said lower end of said internally threaded bore of the associated coupling nut;
    the base portion of the pole structure being positioned on said upper ends of said coupling nuts so that the upper ends of the internally threaded bores thereof are aligned with the openings formed in the base portion;
    threaded bolt members extending downwardly through the openings in the base portion which are threadably received by the upper ends of the internally threaded bores in said coupling nuts;
    each of said coupling nuts having a plurality of radially spaced-apart, vertically disposed grooves extending partially into said coupling nuts towards said internally threaded bore;
    and a reinforcing body member extending around each of said coupling nuts.

2. The coupling of claim 1 wherein each of said coupling nuts is embedded in said body member.

3. The coupling of claim 1 wherein said body member is cylindrical-shaped.

4. The coupling of claim 1 wherein said upper end of said body member is spaced above said upper end of said coupling nut.

5. A breakaway coupling for coupling a pole structure to a supporting foundation, comprising:
    a metal coupling nut having an upper end, a lower end, an internally threaded bore, and an outer surface;
    said coupling nut having a plurality of radially spaced-apart, vertically disposed grooves extending partially into said coupling nut towards said internally threaded bore;
    said grooves extending entirely from the upper end to the lower end of said coupling nut;
    and a reinforcing body member extending around said coupling nut.

6. The coupling of claim 5 wherein said coupling nut is embedded in said body member.

7. The coupling of claim 5 wherein said body member is cylindrical-shaped.

8. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:
    a coupling nut threadably mounted on each of said bolt members;
    each of said coupling nuts having an upper end, a lower end, an internally threaded bore extending between said upper and lower ends, and an outer surface;
    each of said externally threaded upper ends of said bolt members threadably receiving said lower end of said internally threaded bore of the associated coupling nut;
    the base portion of the pole structure being positioned on said upper ends of said coupling nuts so that the upper ends of the internally threaded bores thereof are aligned with the openings formed in the base portion;
    threaded bolt members extending downwardly through the openings in the base portion which are threadably received by the upper ends of the internally threaded bores in said coupling nuts;
    each of said coupling nuts having a plurality of radially spaced-apart, vertically disposed slits extending into said outer surface thereof towards said internally threaded bore;
    and a reinforcing body member extending around each of said coupling nuts;
    said body member having upper and lower ends and wherein said upper end of said body member is spaced above said upper end of said coupling nut to encase the upper end of said coupling nut.

9. The coupling of claim 8 wherein the lower end of said body member is spaced below the lower end of said coupling nut.

10. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being comprised of a fiber-reinforced plastic.

11. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being comprised of a fiber-reinforced material.

12. The coupling of claim 11 wherein said body member is comprised of a fiber-reinforced glass material.

13. The coupling of claim 11 wherein said body member is comprised of a fiber-reinforced nylon material.

14. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being comprised of a steel fiber-reinforced material.

15. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being comprised of a carbon fiber-reinforced material.

16. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being comprised of a Kevlar-reinforced material.

17. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being hexagonal-shaped.

18. The coupling of claim 17 wherein said outer surface of said coupling nut is hexagonal-shaped.

19. The coupling of claim 18 wherein said outer surface of said coupling nut is cylindrical-shaped.

20. The coupling of claim 17 wherein said outer surface of said coupling nut is square-shaped.

21. A breakaway coupling for coupling a pole structure to a supporting foundation, the foundation including a plurality of horizontally spaced-apart, vertically disposed bolt members having externally threaded upper ends, the pole structure including a base portion having a plurality of openings formed therein corresponding to the bolt member of the foundation, comprising:

a coupling nut threadably mounted on each of said bolt members;

each of said coupling nuts having an upper end, a lower end, an internally threaded bore extending between said upper and lower ends, and an outer surface;

each of said externally threaded upper ends of said bolt members threadably receiving said lower end of said internally threaded bore of the associated coupling nut;

the base portion of the pole structure being positioned on said upper ends of said coupling nuts so that the upper ends of the internally threaded bores thereof are aligned with the openings formed in the base portion;

threaded bolt members extending downwardly through the openings in the base portion which are threadably received by the upper ends of the internally threaded bores in said coupling nuts;

each of said coupling nuts having a plurality of radially spaced-apart, vertically disposed slits extending into said outer surface thereof towards said internally threaded bore;

and a reinforcing body member extending around each of said coupling nuts;

said body member being square-shaped.

22. A breakaway coupling for coupling a pole structure to a supporting foundation, comprising:

a metal coupling nut having an upper end, a lower end, an internally threaded bore, and an outer surface;

said coupling nut having a plurality of radially spaced-apart, vertically disposed slits extending into said outer surface thereof towards said internally threaded bore;

said slits extending entirely from the upper end to the lower end of said coupling nut;

and a reinforcing body member extending around said coupling nut;

said body member being comprised of a fiber-reinforced plastic.

23. A breakaway coupling for coupling a pole structure to a supporting foundation, comprising:

a metal coupling nut having an upper end, a lower end, an internally threaded bore, and an outer surface;

said coupling nut having a plurality of radially spaced-apart, vertically disposed slits extending into said outer surface thereof towards said internally threaded bore;

said slits extending entirely from the upper end to the lower end of said coupling nut;

and a reinforcing body member extending around said coupling nut;

said body member being comprised of a fiber-reinforced material.

24. The coupling of claim 23 wherein said body member is comprised of a fiber-reinforced glass material.

25. The coupling of claim 23 wherein said body member is comprised of a fiber-reinforced nylon material.

26. A breakaway coupling for coupling a pole structure to a supporting foundation, comprising:

a metal coupling nut having an upper end, a lower end, an internally threaded bore, and an outer surface;

said coupling nut having a plurality of radially spaced-apart, vertically disposed slits extending into said outer surface thereof towards said internally threaded bore;

said slits extending entirely from the upper end to the lower end of said coupling nut;

and a reinforcing body member extending around said coupling nut;

said body member being comprised of a steel fiber-reinforced material.

27. A breakaway coupling for coupling a pole structure to a supporting foundation, comprising:
   a metal coupling nut having an upper end, a lower end, an internally threaded bore, and an outer surface;
   said coupling nut having a plurality of radially spaced-apart, vertically disposed slits extending into said outer surface thereof towards said internally threaded bore;
   said slits extending entirely from the upper end to the lower end of said coupling nut;
   and a reinforcing body member extending around said coupling nut;
   said body member being comprised of a carbon fiber-reinforced material.

28. A breakaway coupling for coupling a pole structure to a supporting foundation, comprising:
   a metal coupling nut having an upper end, a lower end, an internally threaded bore, and an outer surface;
   said coupling nut having a plurality of radially spaced-apart, vertically disposed slits extending into said outer surface thereof towards said internally threaded bore;
   said slits extending entirely from the upper end to the lower end of said coupling nut;
   and a reinforcing body member extending around said coupling nut;
   said body member being comprised of a Kevlar-reinforced material.

29. A breakaway coupling for coupling a pole structure to a supporting foundation, comprising:
   a metal coupling nut having an upper end, a lower end, an internally threaded bore, and an outer surface;
   said coupling nut having a plurality of radially spaced-apart, vertically disposed slits extending into said outer surface thereof towards said internally threaded bore;
   said slits extending entirely from the upper end to the lower end of said coupling nut;
   and a reinforcing body member extending around said coupling nut;
   said body member being hexagonal-shaped.

30. The coupling of claim 29 wherein said outer surface of said coupling nut is hexagonal-shaped.

31. The coupling of claim 29 wherein said outer surface of said coupling nut is square-shaped.

32. The coupling of claim 29 wherein said outer surface of said coupling nut is cylindrical-shaped.

33. A breakaway coupling for coupling a pole structure to a supporting foundation, comprising:
   a metal coupling nut having an upper end, a lower end, an internally threaded bore, and an outer surface;
   said coupling nut having a plurality of radially spaced-apart, vertically disposed slits extending into said outer surface thereof towards said internally threaded bore;
   said slits extending entirely from the upper end to the lower end of said coupling nut;
   and a reinforcing body member extending around said coupling nut;
   said body member being square-shaped.

* * * * *